United States Patent [19]
Saito et al.

[11] 4,290,682
[45] Sep. 22, 1981

[54] ELECTROMAGNETICALLY OPERATED SHUTTER

[75] Inventors: Syuichiro Saito, Kawasaki; Takashi Uchiyama, Yokohama; Syozo Yoshida, Machida, all of Japan

[73] Assignee: Canon Kabushiki Kaisha, Tokyo, Japan

[21] Appl. No.: 162,323

[22] Filed: Jun. 23, 1980

[30] Foreign Application Priority Data

Jun. 26, 1979 [JP] Japan .............................. 54-87362[U]

[51] Int. Cl.³ .............................................. G03B 9/08
[52] U.S. Cl. .................... 354/234; 354/246; 354/252
[58] Field of Search ............... 354/234, 241, 242, 243, 354/244, 245, 246, 247, 248, 249, 252

[56] References Cited
U.S. PATENT DOCUMENTS

| | | | |
|---|---|---|---|
| 3,580,155 | 5/1971 | Zahn et al. ........................ | 354/234 |
| 3,804,506 | 4/1974 | Fletcher .............................. | 354/234 |
| 3,918,077 | 11/1975 | Burton et al. ..................... | 354/234 |
| 4,149,794 | 4/1979 | Takahama et al. ................ | 354/234 |

Primary Examiner—Russell E. Adams
Attorney, Agent, or Firm—Toren, McGeady & Stanger

[57] ABSTRACT

In the slit shutter disclosed, an actuator transmits the rotational force of an electromagnetic drive arrangement to move shutter blades through opening and closing cycles. A spring arrangement for engaging the actuating means serves to aid the shutter movement at the beginning of the cycle and retard the shutter movement at the end of each cycle while the spring arrangement is energized during its retarding action. According to an embodiment of the invention, the spring arrangement encounters an arm of the actuator at the end of each cycle, absorbs the arm movement during the retardation, and uses the energization to aid the movement at the start of the next cycle. The spring arrangement again encounters the arm at the end of the next cycle.

4 Claims, 8 Drawing Figures

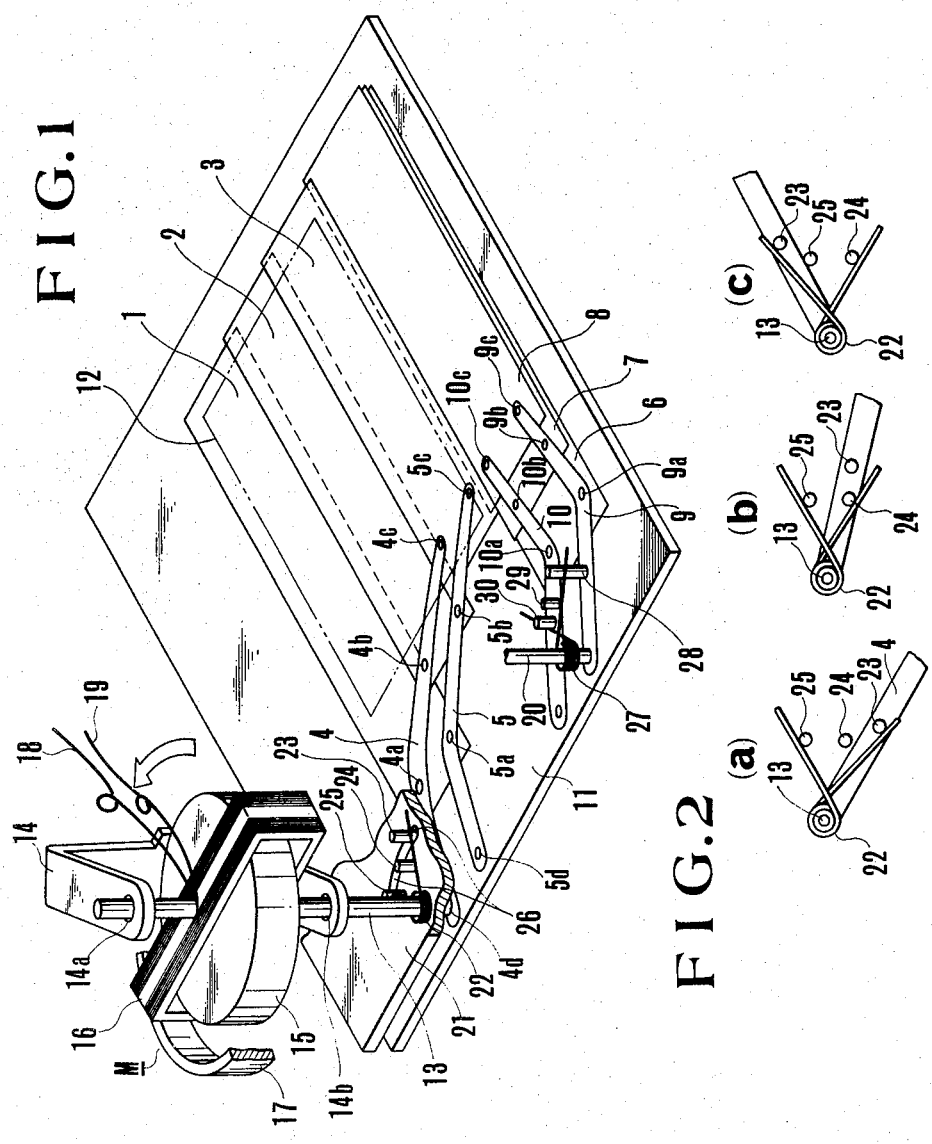

ELECTROMAGNETICALLY OPERATED SHUTTER

BACKGROUND OF THE INVENTION

This invention relates to shutters for use in cameras, and more particularly, to electromagnetically operated slit exposure shutters.

Many camera shutters use a spring as the power source for the shutter and energize or cock the spring in connection with the operation of the camera's film transport mechanism. This arrangement has made it difficult to facilitate minimizing the bulk and size of the camera and to practice low cost production techniques.

Recently, proposals have been made for using an electromagnetic force for driving shutter blades through an exposure operation. A wide variety of electromagnetically operated shutters are being considered. This type of shutter has the advantage of simplicity because it does not need the aforementioned complicated mechanisms. However, the usual cameras suitable for employing such shutters require small and light drive sources and batteries. Therefore, small capacity batteries should normally be selected for this purpose. However, this limits the output of the electromagnetic drive device. It makes it difficult for the shutter blades to achieve sufficiently high operating speeds.

In general, inner magnet-type electromagnetic drive sources are suitable for incorporation into cameras of this type. In such devices, however, it is difficult to insure uniform magnetic flux distribution over the entire working range of the moving coil, and the drive torque exerted varies with the positions along the drive path.

Generally, the drive torque at the start of a shutter blade run is inadequate. This, along with the inertia and friction of the shutter blades, results in a loss of acceleration that prevents uniform exposure over the entire area of the film format.

An object of the present invention is to eliminate the aforementioned disadvantages.

Another object of the invention is to improve electromagnetically operated shutters.

Another object of the invention is to provide electromagnetically operated shutters which can start at high speeds.

SUMMARY OF THE INVENTION

According to a feature of the invention, these objects are attained, in whole or in part, by a resilient member which applies an additional driving force to the shutter blades at the start of each running movement, and is arranged to brake the shutter movement near the end thereof.

The invention is explained in reference to the accompanying drawings.

BRIEF DESCRIPTION OF THE DRAWINGS

FIG. 1 is a perspective view of one embodiment of an electromagnetically operated shutter according to the present invention.

FIGS. 2a to 2c are fragmentary plan views of the assistant spring of FIG. 1 in three different operative positions.

In FIGS. 1 and 2, on a base plate 11 having an exposure window 12 there are shown leading blades 1, 2 and 3 supported by members or arms 4 and 5. The arm 4 is affixed at its one end 4d to a drive shaft 13 which is rotatably mounted on the base plate 11. The arm 5 is rotatably mounted at its one end 5d on the base plate 11. The blades 1 to 3 are movably mounted on the arms 4 and 5 by pins 4a to 4c and 5a to 5c. Trailing blades 6, 7 and 8 are movably mounted on support arms 9 and 10 through pins 9a to 9c and 10a to 10c, and the arms 9 and 10 are mounted at their one ends 9d and 10d fixedly to a drive shaft 20 and movably to the base plate 11 respectively. The shaft 20 is movably mounted on the base plate 11.

Figure 3:
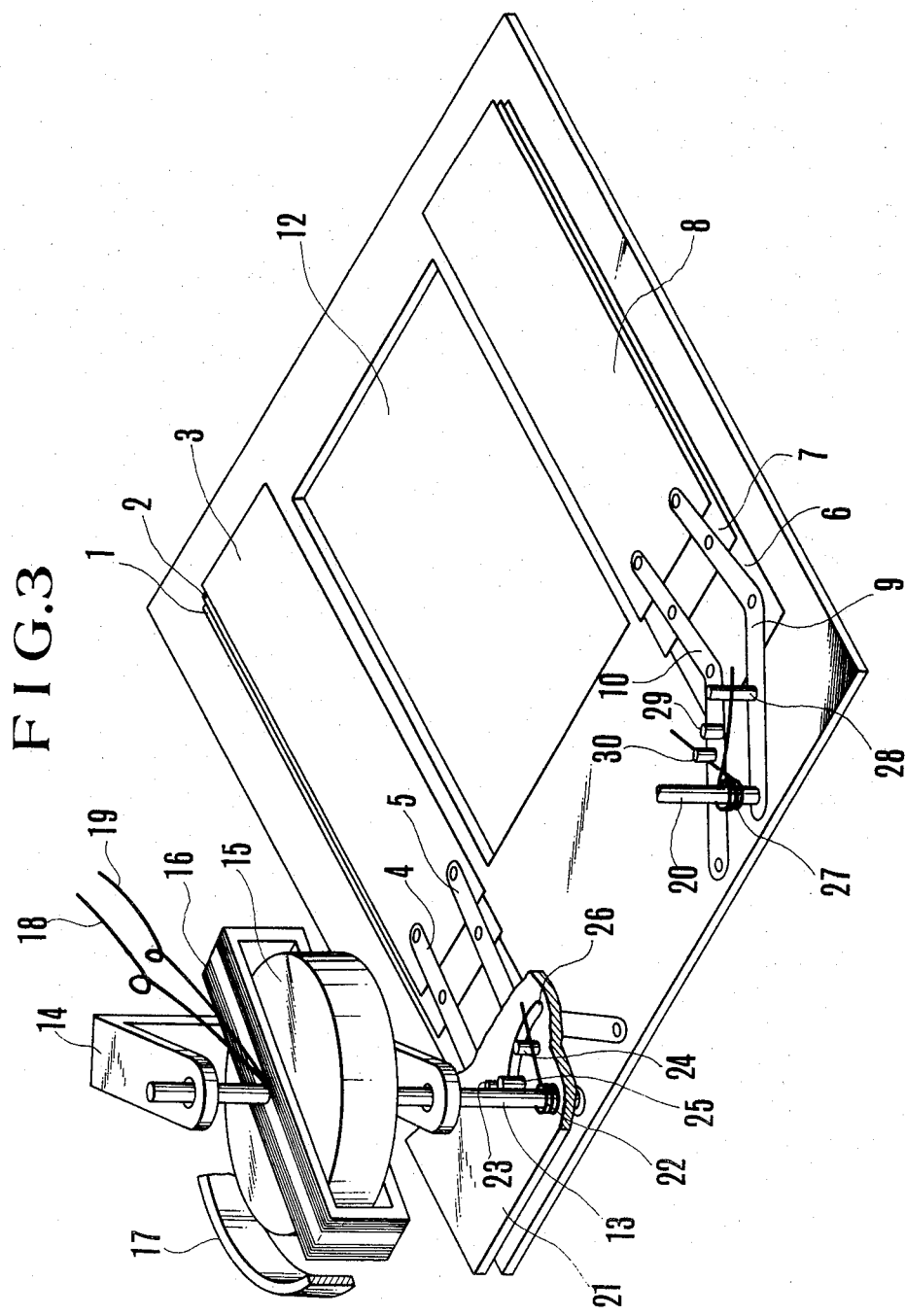
FIG. 3 is a perspective view of the shutter of FIG. 1 in the open position.

An electromagnetic drive source for the leading blades 1 to 3 is indicated at M and comprises a frame 14 for a meter type moving part with a permanent magnet of cylindrical shape diametrically magnetized and fixedly mounted to the frame 14 which is fixedly mounted on the shutter base plate 11 or a stationary member (not shown) in the camera housing. A coil 16 is turned around a bobbin which is fixed to the leading blade drive shaft 13. The shaft 13 are rotatably supported in fitted holes 14a and 14b of the frame 14 so that the coil 16 is rotatable by a predetermined angle within 180°. A yoke 17 faces at the permanent magnet 15 to form a magnetic circuit, is positioned at such a distance from the magnet 15 as to permit rotation of the coil 16, and affixed to the frame 14. 18 and 19 are lead wires for supplying the coil 16 with current therethrough. A cover plate 21 though partly shown for the purpose of clarity is laid over the shutter base plate 11 to provide a space in which the leading and trailing blades 1 to 3 and 6 to 8 are freely movable and has an opening in alignment with the exposure window 12 and holes which the drive shafts 13 and 20 penetrate.

An assistant spring 22 is wound around the shaft 13 and arranged upon setting of the shutter in the initial position to react at one end against a pin 23 extending from the leading blade support arm 4 through an arcuate slot 26 provided in the cover plate 21 and at the other end against a pin 25 fixedly mounted on the cover plate 21 as shown in FIG. 2a, and upon termination of running down movement of the leading blades to react at the former end against a fixed pin 24 on the cover plate 21 and at the latter against the pin 23 as shown in FIG. 2c. Also for the trailing blades there is provided an electromagnetic drive source of the same construction though not shown in the drawings for the purpose of clarity. An assistant spring 27 wound around the shaft 20 reacts at its both ends against either one of pairs of pins 28, 29 and 30 as the trailing blades run down, of which the first pin 28 is fixedly mounted on the arm 9 and extends therefrom through and outwardly of an arcuate slot (not shown) provided in the wall of the cover plate 21.

The operation is as follows. In the shutter charged position illustrated in FIG. 1, the assistant spring 22 urges the leading blade support arm 4 to turn in a counterclockwise direction but the arm 4 is inhibited from turning by a latching means (not shown). When a release of the shutter is actuated, the latching means becomes no longer effective, and the leading blade drive coil 16 is supplied with current from a drive control circuit (not shown) through the lead wires 18 and 19 to exert a force in that part which lies in the magnetic field. This force, as can be explained by Fleming's left hand law, acts in a direction perpendicular to both of the directions of the magnetic flux and the current flow, and the coil 16 reacts against this force to be driven to turn in a counterclockwise direction indicated by arrow as viewed in the figure. Thus, this force functions as a couple of forces on the drive shaft 13. Therefore, the leading blade drive shaft 13 affixed to said coil 16 also receive the rotative force in the same direction and the leading blade support arm also receives a force to rotate in a counterclockwise direction. Therefore, the leading blade support arm 4 moves in the counterclockwise direction from the position illustrated in FIG. 2(a) under the force of the assistant spring 22 and the electromagnetic force while driving the leading blades 1 to 3 to move upward as viewed in FIG. 1, thus initiating an exposure. When the leading blade support arm 4 has moved a certain predetermined angle, as shown in FIG. 2(b), the assistant spring 22 contacts with the spring catching pin 24 so that as moving away from the assistant spring 22, the pin 23 no longer receives the force of the spring 22 and therefore that the leading blades 1 to 3 continue to run down under the electromagnetic force only. Before the termination of a running down of the leading blades, when the leading blade support arm has moved by a further certain predetermined angle, the position illustrated in FIG. 2(c) is taken with the pin 23 contacting with the assistant spring 22 and having moved until the assistant spring 22 is charged. Then, the arm 4 is held by a latching means (not shown). During this time, the assistant spring 22 serves as a brake. After the current supply to the leading blade drive coil 16, an exposure time is formed by the control circuit. At the termination of duration of the exposure time, the latching means for the trailing blades is actuated to release, and the trailing blade drive coil is supplied with current and the trailing blades operate in a similar manner to that in which the leading blades operate, thus terminating the exposure. This is followed by a resetting operation (returning movement) which causes the leading and trailing blades to return while the assistant spring 22 operates in the reverse manner to that when the exposure is taken as follows:

Since the leading and trailing blades operate in exactly the same manner, explanation is given only to the leading blades.

When the latching means is released, and the leading blade drive coil 16 is supplied with current flowing in the reversed direction to that when taking the exposure by the drive circuit, the force of the assistant spring 22 and the electromagnetic force act on the leading blades and the latter start to run up from the position illustrated in FIG. 2(c) toward the reset position. When the leading blade support arm 4 has moved a certain predetermined angle, taking a position of FIG. 2(b), the assistant spring 22 is blocked by the spring catching pin 25. Then, the pin 23 moves away from the assistant spring 22 so that the leading blades continues to run up under the action only of the electromagnetic force. When a further movement of the leading blade support arm 4 takes the reach of a certain predetermined angle, the position of FIG. 2(a) is assumed where the pin 23 contacts with the assistant spring 22 and then charges said spring until it is held by the latching means. During this time, the assistant spring 22 also functions to brake the leading blades. The trailing blades also operate in exactly the same manner. FIG. 3 shows a position where the exposure window 12 shown in FIG. 1 is fully opened.

Figure 4:
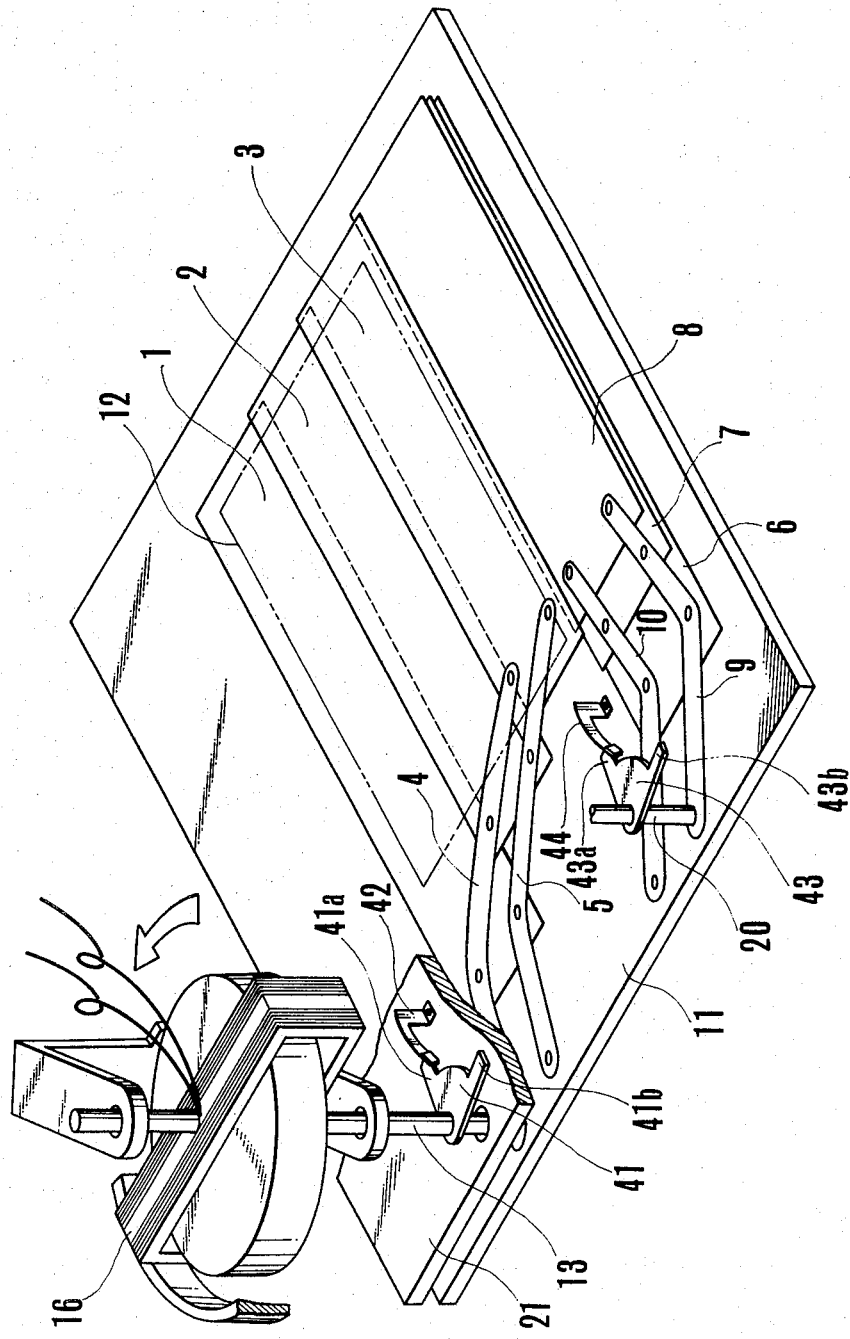
FIG. 4 is a perspective view of another embodiment of the present invention.

FIG. 4 is a perspective view showing another embodiment of the electromagnetically operated shutter according to the present invention, where the same reference characters have been employed to denote the similar parts to those shown in FIG. 1. 41 and 43 are assistant plates affixed to the leading and trailing blade drive shafts 13 and 20 respectively and each having two fingers 41a and 41b, or 43a and 43b formed in portions thereof. 42 and 44 are assistant springs having shock absorbing members arranged to contact with the assistant plates 41 and 43 and fixedly mounted on the cover plate 21, which is shown as broken away in the neighbourhood of the position of the trailing blades for the purpose of better understanding of the construction of the drive mechanism. The shutter is assumed in FIG. 4 to be in the charged position.

The operation of the shutter of FIG. 4 is as follows. Since the leading and trailing blades operates in a similar manner to each other, explanation is given only to the operation of the leading blades. In connection with the shutter charged position, it should be pointed out that the leading blades 1 to 3 are held stationary by a latching means (not shown) while the assisting spring 42 is in a charged position by the assistant plate 41 with its fingered portion 41a in engagement with the free end of the spring 42. When a release of the shutter is actuated, the latching means is taken out of connection with the leading blades 1 to 3, and the leading blade drive coil 16 is supplied with current from a drive circuit, thereupon the leading blades 1 to 3 starts to run down under the electromagnetic force and the force of the assistant spring 42 transmitted through the above-described finger 41a. When the assistant plate 41 has moved a certain predetermined angle, a finger 41a is no longer in contact with the assistant spring 42. Then, the leading blades continues to run down under the electromagnetic force. As the assistant plate 41 further turns, the other finger 41b is brought into contact with the assistant spring 42. Then the leading blades are stopped while charging the spring 42, and held by a latching means (not shown).

In an exposure time interval determined by a control circuit, the trailing blades are actuated to run down to the exposure aperture closed position. This is followed by a resetting operation which takes the leading and trailing blades to move in the opposite direction to that when making the exposure. Since the leading and trailing blades operate in a similar manner to each other, next explanation is given only to the operation of the leading blades. When the latching means holding the leading blades in the position for the termination of the exposure is released, and the leading blade drive coil 16 is supplied with current flowing in the reversed direction to that when making the exposure by the drive circuit, the leading blades start to run up under the electromagnetic force and the force of the assistant spring 42. When the assistant plate 41 has moved a certain predetermined angle, the finger 41b is freed from the assistant spring 42. Then the leading blades continues to return under the electromagnetic force. Upon further rotation of the assistant plate 41, the other finger 41a abuts against the assistant spring 42, and then charges the latter until the leading blades are held by the latching means (not shown). Thus, the resetting is completed. It should be pointed out the whilst being charged by the finger 41a or 41b, that assistant spring 42 functions as a brake.

Figure 5:
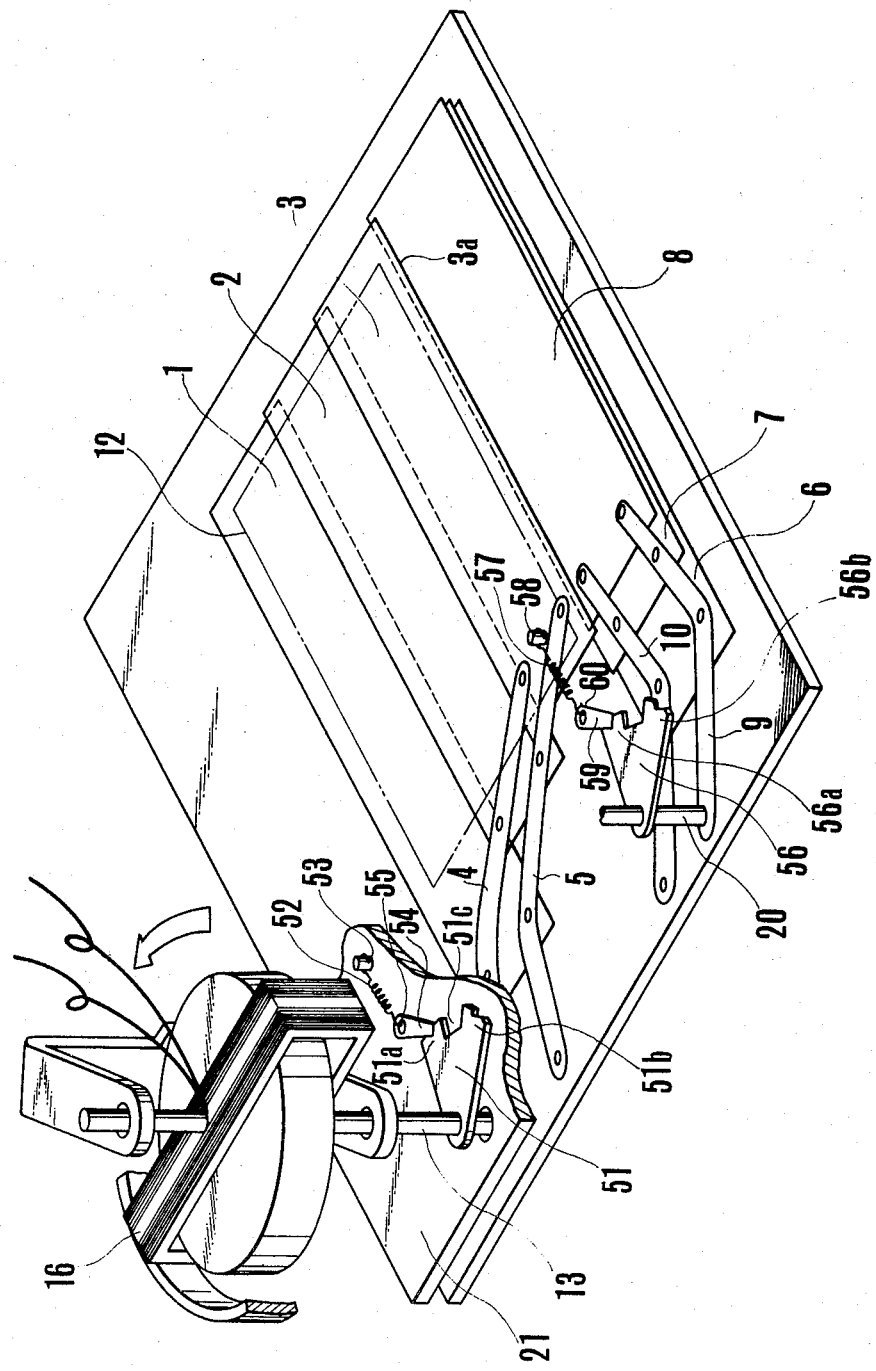
FIG. 5 is a perspective view of still another embodiment of the invention.

FIG. 5 shows still another embodiment of the present invention in the charged position. In this figure also the same reference characters have been employed to denote the similar parts to those shown in FIGS. 1 and 4.

Assistant plates 51 and 56 are fixedly mounted to the leading and trailing blade drive shafts 13 and 20 respectively, and each provided with two pawled portions 51a and 51b, or 56a and 56b each having a cutout for a click stop. Assistant levers 54 and 59 are pivoted about respective pins 55 and 60 which are fixedly mounted on the cover plate 21. Assistant springs 52 and 57 are connected at one ends to the assistant levers 54 and 59 respectively and at the other ends to fixed pins 53 and 58 on the cover plate 21. The cover plate 21 is shown as broken away in a portion over the trailing blades for better understanding of the construction of the blade drive mechanism.

Figure 6:
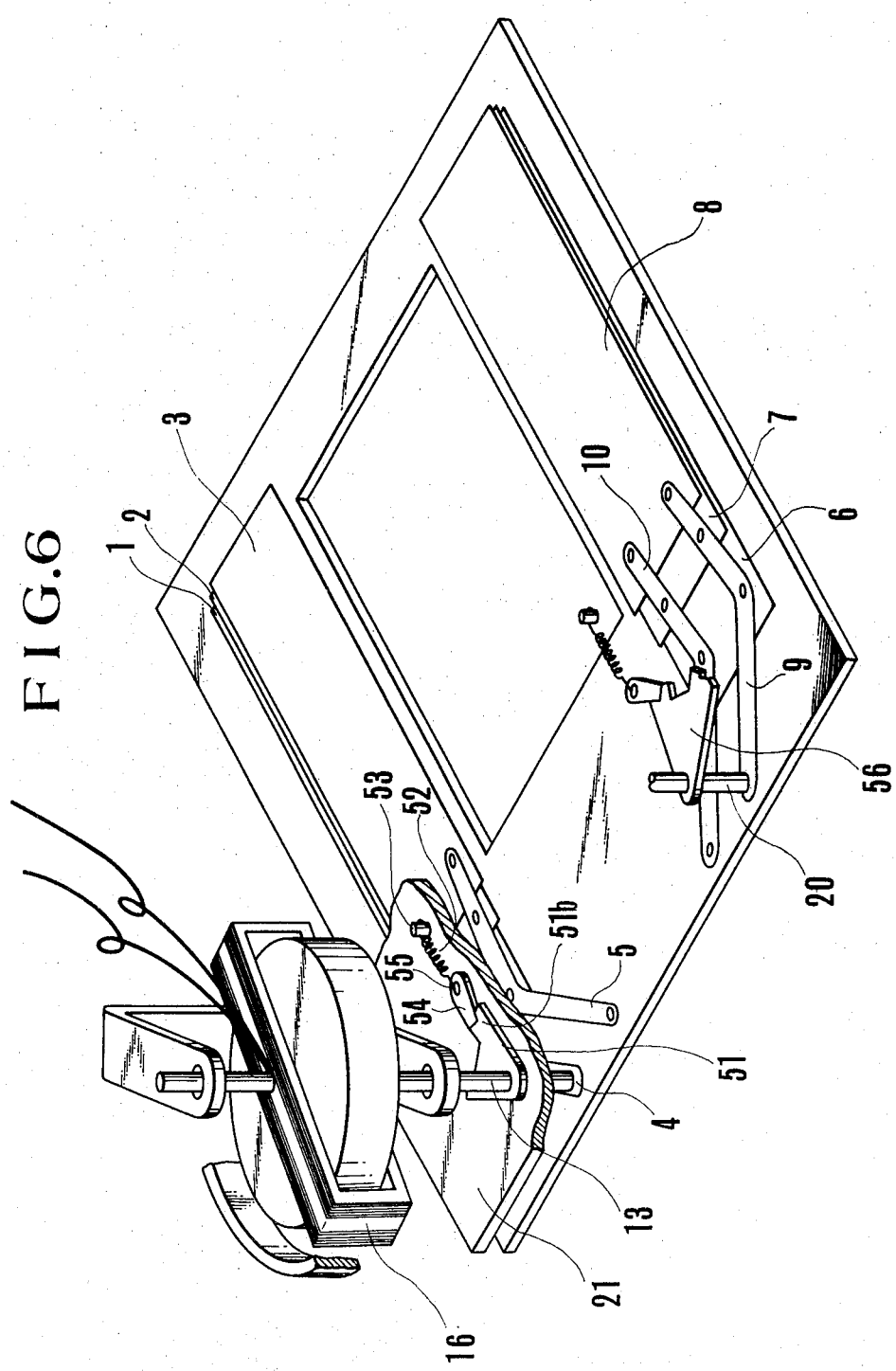
FIG. 6 is a similar view of the shutter of FIG. 5 in the open position.

The operation of the shutter of FIGS. 5 and 6 is as follows. In this embodiment, the click mechanism also serves to latch the shutter blades. Since the leading and trailing blades operate in a similar manner to each other, next explanation is given only to the operation of the leading blades.

With the shutter in the charged position of FIG. 5, the assistant lever 54 engages in the cutout of the pawled portion 51a of the assistant lever 54 while charging the assistant spring 52, thereby the leading blades 1 to 3 are latched. When the leading blade drive coil 16 is supplied with current from a drive circuit, the electromagnetic force drives the assistant plate 51 to turn in a counterclockwise direction.

This causes the assistant lever 54 to be pushed by the slant surface of the above-described cutout at the free end thereof and to be turned in a counterclockwise direction. Then the lever 54 is taken out of the engagement in the cutout of the pawl 51a. Upon further slight rotation of the assistant plate 51 in the counterclockwise direction by the electromagnetic force, the assistant lever 54 is slipped off from the pawl 51a and then drops down into a recessed portion 51c between the pawls 51a and 51b while being turned in a clockwise direction by the force of a spring 52 to add a driving force to the assistant plate 51. At this time, the border 3a of the leading blade 3 is about to open the exposure window 12. From this time onward, therefore, an exposure is initiated.

As the assistant plate 51 continues to turn, the assistant lever 54 is left behind the first pawl 51a of assistant plate 51, and the leading blades are driven by only the electromagnetic force to run down. Upon further rotation of the assistant plate 51, the second pawl 51b abuts on and turns the assistant lever 54 in the clockwise direction against the force of the assistant spring 52. Then the assistant lever 54 engages in the cutout of the second pawled portion 51b as shown in FIG. 6, thus latching the leading blades in the exposure window open position.

In an exposure time interval depending upon the output of a control circuit, the trailing blade drive coil is supplied with current and the trailing blades are driven to run down, thus terminating the exposure. After that, the leading and trailing blades are reset simultaneously. Since the leading and trailing blades operate in a similar manner to each other, next explanation is given to the leading blades only.

When the leading blade drive coil 16 is supplied with current flowing in the reversed direction to that when making the exposure, a force is exerted to turn the coil in the clockwise direction and the assistant plate 51 starts to turn in the clockwise direction. The assistant lever, in turning clockwise, is disengaged from the assistant plate 51. As the assistant plate 51 continues to turn, the assistant lever 54 is turned counterclockwise, thus adding to the assistant plate 51 a force acting in the same direction of the rotation of the latter. As the assistant plate 51 continues to turn, it is moved away from the assistant lever 54. From this time, the electromagnetic force only contributes to the driving of the leading blades. Upon further rotation of the assistant plate 51, the pawled portion 51a causes the assistant lever 54 to turn counterclockwise. Then, in a position where the assistant spring 52 is charged, it occurs that the assistant lever 54 engages in the cutout of the pawled portion 51a, thus latching the leading blades in the reset position. It should be pointed out that the assistant spring 52 and 57 serves as a brake when charged.

FIG. 6 shows the exposure window open position of the shutter.

It will be appreciated that the present invention contemplates the use of an assistant spring in improving the initial acceleration of the shutter blades while nevertheless further contributing to the braking of the shutter blades when they near the terminal end of movement thereof and therefore to the absorbing the shock which would be otherwise resulted when they get stopped by a stationary member. Therefore, the electromagnetically operated shutter of the present invention advantageously prolongs the life-time of the used battery of small capacitance despite the fact that the shutter blades are driven to run at a greatly increased speed.

What is claimed is:

1. An electromagnetically operated type slit exposure shutter comprising:
   (a) electromagnetic drive sources each having a permanent magnet and a movable magnetic coil for receiving current to exert a rotative force;
   (b) shutter blades arranged to open and close an exposure aperture;
   (c) shutter blade actuating means for transmitting the rotative force of said electromagnetic drive sources to said shutter blades so as to make said shutter blades run down or up to effect an exposure and a resetting; and
   (d) spring means for engaging said shutter blade actuating means, said spring means being arranged for imparting to said actuating means a driving force aiding the running of said shutter blades when said shutter blades start to run, and for imparting a braking force to said actuating means when said shutter blades near the end of movement thereof, while being energized by said actuating means.

2. An electromagnetically operated slit exposure shutter, comprising:
   electromagnetic drive means for exerting rotational forces;
   shutter blade means for opening and closing an exposure aperture;
   actuating means for transmitting the rotational forces of said drive means to said shutter blade means so as to cause said shutter blades to run through an opening operating movement and a closing operating movement;

spring means coupleable to said actuating means for imparting a drive force adding the operating movement of the shutter blade means when the shutter blades start an operating movement and for retarding the actuating means at the end of an operating movement while absorbing the motion of the actuating means so as to be energized thereby.

3. A shutter as in claim 2, wherein said actuating means includes:
an arm movable through an operating path during an operating movement;
said spring means being arranged to engage said arm at the beginning and at the end of said path.

4. A shutter as in claim 3, wherein said actuating means includes:
a pivot about which said arm pivots,
a pair of posts passed which said arm swings,
said arm having a pin,
said spring means having a coil spring section mounted on the pivot, and
a pair of spring extensions extending from the coil spring portion and biased toward said posts in opposing relation and towards each other, said pin on said arm being arranged to engage said extensions and move said extensions away from their biasing directions.

* * * * *